United States Patent [19]

Kindl et al.

[11] 4,086,150

[45] Apr. 25, 1978

[54] CHROMATE REMOVAL BY PRECIPITATION

[75] Inventors: Bruno Kindl, Kingston; Jennifer Geraldine Atkinson, Amherstview, both of Canada

[73] Assignee: Huron Chemicals Limited, Kingston, Canada

[21] Appl. No.: 810,544

[22] Filed: Jun. 27, 1977

[51] Int. Cl.$^2$ .................. C25B 1/26; C01B 17/00
[52] U.S. Cl. ......................................... 204/95; 204/98; 204/101; 204/128; 210/50; 423/55; 423/511; 423/571; 423/607
[58] Field of Search .................. 423/607, 511, 55, 571; 204/98, 128, 101, 95; 210/50

[56] References Cited

U.S. PATENT DOCUMENTS

| | | | |
|---|---|---|---|
| 3,294,680 | 12/1966 | Lancy | 210/49 |
| 3,325,401 | 6/1967 | Lancy | 210/49 |
| 3,427,236 | 2/1969 | Scholander et al. | 204/95 |
| 3,616,344 | 10/1971 | Peterson et al. | 204/143 |
| 3,740,331 | 6/1973 | Anderson | 210/53 |
| 3,835,001 | 9/1974 | O'Brien | 204/95 |
| 3,835,042 | 9/1974 | La Lancette et al. | 210/28 |
| 3,901,805 | 8/1975 | Stewart | 210/50 |
| 3,961,029 | 6/1976 | Senoo | 423/54 |
| 3,980,751 | 9/1976 | Foulkes | 423/54 |
| 3,981,965 | 9/1976 | Gancy et al | 423/55 |

FOREIGN PATENT DOCUMENTS

| | | |
|---|---|---|
| 917,829 | 12/1972 | Canada. |
| 968,084 | 5/1975 | Canada. |
| 990,933 | 6/1976 | Canada. |

*Primary Examiner*—R. L. Andrews
*Attorney, Agent, or Firm*—Beveridge, DeGrandi, Kline & Lunsford

[57] ABSTRACT

Chromates are removed from aqueous alkali metal chlorate solutions by either of two processes. In the first process, a water-soluble sulfide is added to react with the chromate, and then a ferrous salt is added. The soluble sulfate is converted to elemental sulfur and the chromate is converted to an insoluble trivalent Cr-containing material which is removed from solution. In the second process an "iron mud" is prepared by reacting a ferrous salt with sodium hydroxide and added so as to precipitate insoluble trivalent chromium-containing material.

16 Claims, No Drawings

CHROMATE REMOVAL BY PRECIPITATION

The present invention relates to the removal of chromates from aqueous solutions containing high concentrations of alkali metal chlorides.

Aqueous alkali metal chlorate solutions, and in particular sodium chlorate solutions which also contain sodium chloride, are conventionally produced by the electrolysis of brine in electrolytic cells, usually bipolar electrolytic cells, the extent of the electrolysis suitably being controlled to produce an effluent from the cell in which the sodium chlorate and sodium chloride have essentially the selected ratio for optimum production of chlorine dioxide for use inter alia in the bleaching of chemical cellulosic pulps. However, in the electrolysis of the sodium chloride in the bipolar electrolytic cells to form sodium chlorate, it is conventional to add chromates to the electrolyte in the cell because the chromates significantly improve the current efficiency of the cells in the conversion of the sodium chloride to sodium chlorate. By ther term "chromate" is meant any of the species chromate, dichromate and polychromate, the form being determined primarily by the pH. Chromate thus occurs in significant amounts in the cell effluent and it is desirable to remove this chromate from the cell effluent before it is processed in the chlorine dioxide generator, as it is considered to have an adverse effect upon the production of the chlorine dioxide. Equally important, chromate is a valuable material; hence it is desirable to recover it for re-use in the electrolytic cells. Moreover, alkali metal dichromates are highly coloured salts and are objectionable impurities when permitted to remain in the chlorate product for this reason alone. Furthermore, there is the ever-present danger that the chromate, in which chromium is in the hexavalent state, will be passed into waste effluents from industrial processes such as the generation of chlorine dioxide or pulping processes, and appear in the environment as a toxic pollutant. Because of the high degree of toxicity of hexavalent chromium, and for other reasons as outlined above, it is very important that chromates be removed as completely as possible from aqueous solutions containing said chromates, such as for instance from the above-mentioned alkali metal chlorate solutions.

Numerous processes have been proposed in an attempt to effect removal of chromium, particularly hexavalent chromium, from aqueous solutions. The most satisfactory of these processes are based upon (I) reducing the chromium to its trivalent state, followed by (II) precipitating the trivalent chromium as chromic hydroxide, according to the following equations:

$$CrO_4^{-2} + 8H^+ + 3e^- \rightarrow Cr^{+3} + 4H_2O \quad (I)$$

or $$Cr_2O_7^{-2} + 14H^+ + 6e^- \rightarrow 2Cr^{+3} + 7H_2O$$

$$Cr^{+3} + 3OH^- \rightarrow Cr(OH)_3 \quad (II)$$

One example of a prior art process is described in U.S. Pat. No. 3,427,236 of Scholander et al. In this patent, a process for preparing alkali metal chlorate solutions for use in generating chlorine dioxide in which chromium salts are present is described. The pH of the solution is adjusted to a value, e.g., a pH of 7 to 8, at which the chromium is converted to chromate ions, then a soluble barium or lead salt is added to precipitate the chromate content of the solution, and the chromate precipitate is then separated from the chlorate solution. The chromate precipitate can then be redissolved by treatment with acid and the chromium-containing solution recycled to the electrolysis step. Scholander's process is said to be applicable to chlorate solutions having $NaClO_3$ concentrations in the range of 500–650 grams per liter.

U.S. Pat. No. 3,843,769 of Partridge and Hildyard teaches a process whereby alkaline alkali metal chlorate solutions containing hexavalent chromium are treated with at least about a 3-molar proportion of a water-soluble sulfide such as sodium sulfide, sodium bisulfide, potassium bisulfide or hydrogen sulfide. Preferably an excess of the sulfide is added to the solution. Then the solution is neutralized to a pH below about 5, whereby the trivalent chromium is precipitated as an insoluble product, and is then removed from the solution. Partridge et al. disclose the treatment in this way of chlorate solutions having about 350 grams per liter of $NaClO_3$, but do not disclose the treatment of higher concentrations of sodium chlorate.

Peterson and Dexter describe, in U.S. Pat. No. 3,616,344, a process wherein an alkali metal chlorate solution used for electrochemical machining is treated with a ferrous salt or an alkali metal or ammonium sulfide, or a stannous salt to reduce hexavalent chromium in the chlorate solution to the trivalent state in which it precipitates from solution as hydrous chromic oxide. Solutions treated in this way have a chlorate concentration of 300–400 grams $NaClO_3$ per liter. As an alternative procedure, Peterson mentions the use of a soluble salt of divalent zinc, lead, cobalt or copper as a reagent to effect removal of the chromate ions in the form of an insoluble chromate, from the solution.

Chromium-containing solutions are treated by a process described in U.S. Pat. No. 3,835,042 of Lalancette et al., in which a water-soluble ferric salt is added to the solution, and the solution thus obtained is then treated with an agent such as sodium sulfide to form an insoluble complex sulfide salt of chromium and iron. The insoluble precipitate containing the chromium is then removed by filtering the solution through a bed of peat moss. Lalancette is concerned with the decontamination of waste waters from electroplating solutions: there is no teaching or suggestion of the process being applicable to chlorate solutions.

In other known processes for the removal of chromate from chlorate solutions, the chromate-containing solution is passed through an ion-exchange resin. An example of this is U.S. Pat. No. 3,835,001 of O'Brien, wherein there is described the removal of chromate from sodium chlorate solutions having a concentration of the order of 500 grams per liter by passing a stream of the chlorate solution through a strongly anion-exchange resin in chloride ion form. According to this process, the chromium may be recovered for recycling to the electrolytic process for producing the alkali metal chlorate, by regenerating the chromate-loaded ion-exchange resin using sodium chloride brine at high pH.

Frank R. Foulkes describes in U.S. Pat. No. 3,980,751 a process in which chromate is removed from an electrolytic cell effluent containing sodium chlorate and sodium chloride, in which process the chlorate solution, acidified with HCl to a pH of not less than 0.5, is passed through an anion-exchange resin bed to remove chromate therefrom. The bed is then regenerated by passing through it an aqueous solution of an alkali metal hydroxide and alkali metal chloride to remove chromate, then it is converted to an acid form and the resin is saturated with alkali metal chlorate essentially free of chromate, ready for further use.

The above-mentioned prior art processes for the removal of hexavalent chromium from aqueous solutions containing same are in general effective for the purpose intended, but they do have serious drawbacks. For instance, in known chemical reduction methods of removing chromate from aqueous solutions, not only is pH control sometimes difficult, but greater than stoichiometric quantities of the various chemical reagents are usually required; and from a pollution standpoint, one toxic pollutant (chromate) is replaced by another (such as the reducing agent itself). Further, the processed solution for the chlorine dioxide generator normally ends up alkaline and must be re-acidified for use in the chlorine dioxide generator. Also, noxious gases such as hydrogen sulfide are sometimes evolved. In a process such as that of Scholander, where the chlorate solution is treated with a soluble barium salt to remove the chromate impurity as an insoluble barium salt, there is the drawback that soluble barium salts are relatively expensive, and also combine with any sulfate salts present to produce difficultly-filterable precipitates. Furthermore, the reagent is toxic and itself presents pollution problems in the disposal of wastes from processes utilizing alkali metal chlorates.

Another significant drawback to known processes for removing chromates from alkali metal chlorate solutions is that such processes are ineffective in eliminating chromates from highly-concentrated chlorate solutions containing more than 600 grams per liter of alkali metal chlorate. Partridge and Hildyard indicate in U.S. Pat. No. 3,843,769 the difficulties they encounter already in liquors containing 200 to 400 grams per liter $NaClO_3$, in removing chromates using a soluble sulfide to reduce the hexavalent chromium to an insoluble trivalent chromium-containing product, by stating that the theoretical amount of $Na_2S$ is 3.4 moles/mole of dichromate, but that a 100% excess is common and that in practice 10 to 20 moles of $Na_2S$ per mole of dichromate are to be used, i.e., an excess of nearly six times (see Columns 2 and 3 of U.S. Pat. No. 3,843,769). This is borne out by applicants' experience, which is that procedures which are effective for removing chromate from alkali metal chlorate solutions which have a concentration of chlorate up to 600 gpl (grams per liter) give poor results when the alkali metal chlorate solutions have a chlorate concentration of 730 gpl.

An objective of the present invention is to provide a process for removing chromates effectively from highly-concentrated alkali metal chlorate solutions.

Another objective of the present invention is to provide a process for removing chromates effectively from aqueous chlorate solutions without requiring an undue excess of chemicals.

Still another objective of this invention is to provide a process for removing chromates from aqueous chlorate solutions which avoids the emission of noxious gases such as hydrogen sulfide.

A further objective of this invention is the removal of chromates from aqueous alkali metal chlorate solutions by a process which substantially avoids the substitution of one toxic material by other toxic, polluting materials.

The present invention, in one aspect, resides in a method of removing chromate from aqueous alkali metal chlorate solutions which comprises:

adding to a chromate-containing aqueous solution of an alkali metal chlorate, at a temperature of about 40° to about 60° C, a water-soluble sulfide in an amount ranging from about 70 to about 200% of the stoichiometric value required to react with said chromate, said aqueous solution having an initial pH in the range of 7–8;

then adding to said solution a water-soluble ferrous salt in an amount ranging from about 30 to about 100% of the stoichiometric value required to react with said chromate, and adjusting the pH of the solution such that the final pH is in the range of about 1.8 to about 3.0, whereby said chromate is converted to an insoluble trivalent chromium-containing material and the sulfide is completely converted to elemental sulfur; and separating said insoluble trivalent chromium-containing material from said solution.

In another aspect of the present invention, there is provided a method of removing chromate from aqueous alkali metal chlorate solutions which comprises:

adjusting the pH of a chromate-containing aqueous solution of an alkali metal chlorate to a value within the range of from about 7 to about 11, said solution having a temperature of about 40° to about 60° C;

adding to said solution the product obtained by reacting a ferrous salt with an alkali metal hydroxide in relative proportions of 1 part ferrous salt to 1.5–1.8 parts of said alkali metal hydroxide, the amount of said ferrous salt employed being from about 3 to about 5 times the stoichiometric amount required to reduce the chromate present in the solution, said addition being effected slowly, and simultaneously with strong agitation, and said pH being controlled to a value within the range of 10–12, whereby said chromate is converted to an insoluble trivalent chromium-containing material; and separating said insoluble trivalent chromium-containing material from said solution.

The present invention (both methods) is effective in removing chromates from very concentrated alkali metal chlorate solutions, i.e., where the concentration of alkali metal chlorate is in the range of 600–750 gpl. It is, moreover, believed that the methods of the present invention are the only methods which are really applicable to aqueous solutions having high chlorate concentrations, such as within the range of 600–750 gpl given above.

In U.S. Pat. No. 3,740,331 of John R. Anderson and Charles O. Weiss, issued June 19, 1973, said patent being assigned to Sybron Corporation, a sulfide precipitation process is described in which heavy metal pollutant ions are removed from an aqueous solution containing same. The process comprises:

(a) adding a soluble salt of a heavy metal that forms a sulfide having a higher equilibrium sulfide ion concentration than the sulfide of the heavy metal pollutant to the solution; and (b) adding enough soluble sulfide to the solution to precipitate the heavy metal pollutant ions but less than the amount required to precipitate both the heavy metal pollutant ions and the added heavy metal ions, whereby the heavy metal pollutant ions are precipitated in preference to the heavy metal ion added to the solution. The added heavy metal acts as a scavenger for excess sulfide.

The Anderson et al. process referred to above is similar in some respects to applicants' first-mentioned process. However, there are significant differences between the respective processes, and these are outlined below, as follows:

(1) Anderson et al. nowhere suggest in their patent the applicability of their process to chloratecontaining liquors.

(2) The method of the present invention uses the stoichiometric amount of sulphides to reduce $Cr^{+6}$ to $Cr^{+++}$ and then adds an amount of $Fe^{++}$ ion less than stoichiometric to reduce Cr, and allows the pH to go quite low so as to eliminate sulphide ions.

(3) Anderson and Weiss add $Fe^{++}$ (or other heavy metals) and sulfide to the solution but do not mention adding sulphide first and $Fe^{++}$ afterwards, as is done in the first-mentioned aspect of the present invention.

(4) A test which applicants conducted showed that adding $Fe^{++}$ first followed by NaHS neither reduces the hexavalent chromium nor precipitates it.

(5) Applicants did not try to add $Fe^{++}$ and NaHS, simultaneously as it was expected that FeS would be formed; FeS would not be able to reduce $Cr^{+6}$ to $Cr^{+3}$ at a practical rate.

(6) Chromium reduction and precipitation is described in U.S. Pat. No. 3,740,331, but the Anderson et al. process is applied to aqueous solutions having $Cr^{+6}$ concentrations only in the low ppm range and not in the high $Cr^{+6}$ concentrations to which this invention is applicable.

(7) An essential feature of the first-mentioned aspect of the present invention is the addition of $Fe^{++}$ ions after addition of a soluble sulfide, and allowing the pH of the solution to fall to 1.8–3.0; this provides the double advantage of having a low pH solution of chlorate ready for use in a chlorine dioxide generator, and of eliminating the sulfide ions.

(8) Anderson and Weiss leave the liquors at a high pH (see the Examples IA, B; IIA, B of U.S. Pat. No. 3,740,331), and nowhere mention low pH nor sulfide residuals in their specification.

In the first-mentioned method, according to the present invention, the initial pH value may be in the range from 7 to 8, and is desirably set at 8. In the second-mentioned method, according to this invention, the pH is initially adjusted to within the range of about 7 to about 11, preferably to about 11. Control of the pH is effected by additions of alkali, as required, during the step of adding the ferrous salt, in both methods.

The purpose of the pH control during the $FeSO_4$ additions is that of preventing the liquor from becoming too acid according to reaction 1:

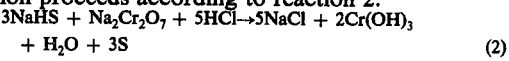

Too low a pH could dissolve chromium hydroxide and could cause decomposition of sodium chlorate. We have found that a pH of between 1.8 and 3.0 (desirably about 2) is satisfactory for the first method, and an alkaline pH value of between 10 and 12 (desirably about 11) is satisfactory for the second method, as final pH values at the end of the process.

It can, therefore, be stated that the preferred procedures comprise using the liquors at initial pH's of 8 and 11, respectively, but initial pH values of 7 to 8 and 7 to 8 for the respective processes are also acceptable as long as the pH is controlled thereafter.

The pH of the liquors treated according to the first-mentioned method has to be acid at the last stage of the treatment, viz, in the range of 1.8 to 3.0 as stated above.

The low pH is necessary to effect oxidation of the last traces of sulphide ions to sulphur. It is believed that the reaction proceeds according to reaction 2:

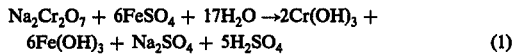

Suitable adjustment of the pH of the solution in the first-mentioned method makes it possible for the ferrous salt, e.g., $FeSO_4$, to react with the last traces of unreacted alkali metal hydrosulfide to make a stable insoluble iron sulphide such as FeS or $Fe_2S_3$.

The low final pH (pH 1.8–3.0) of the liquor (after filtering to remove the precipitated insoluble Cr-containing material) renders it particularly suitable for use in a chlorine dioxide generator.

The temperature of the solution being treated should be in the range from about 40° to about 60° C, and ideally is about 50° C.

The operable amounts of NaHS and $FeSO_4$ to be employed in the first-employed process can be deduced from a few lab tests. The amount of NaHS may range from about 70% of the stoichiometric value (see reaction 2) to about 200% of the stoichiometric value, the preferred amount being 100% of the stoichiometric value. The amount of $FeSO_4$ to be used may range from about 30 to about 100% of the stoichiometric value, the preferred amount being 57% of the stoichiometric value (according to reaction 1).

Our first-mentioned process can remove chromate from alkali metal chlorate solutions without requiring an undue excess of chemicals, i.e., 3 moles of NaHS + 3.42 moles of $FeSO_4$. This means that the theoretical amount of NaHS + 57% of the theoretical amount of $FeSO_4$ is sufficient to remove the chromate from solution. Applicants have not found in practice any need to use more than that specified above in 700 gpl $NaClO_3$ liquors.

In the second-mentioned process, the reaction product of ferrous salt and caustic, which may be designated as an "iron mud," is made preferably by mixing 1 mole of $FeSO_4 \cdot 7H_2O$ to 1.7 moles NaOH, in 50% by weight solution. This is required to keep the pH constant. However, the ratio of $FeSO_4$ to NaOH can be changed provided that the pH is carefully controlled during the reaction.

We have tested also additions of pure $FeSO_4 \cdot 7H_2O$, with the only trouble being that the caustic has to be added quite quickly.

The relative amounts of NaOH to $FeSO_4$ used may be in the range of 1–2:1, preferably 1.5–1.8:1, and still more preferably at a ratio of 1.7:1. (All these proportions are expressed in terms of molar ratio.) The stoichiometric ratio of ferrous sulphate to dichromate is in the range of 3–5:1, and preferably is in the range of 3.5–4.0:1.

The preferred reagents to use in the first process are NaHS and ferrous sulfate (or ferrous ammonium sulfate). However, other water-soluble sulphides and ferrous compounds can be used in the process. In the second process the ferrous compound need not necessarily be $FeSO_4$: any water-soluble ferrous compound could be used. Likewise, any strong caustic could be used. The preferred such alkali is NaOH; however, if desired, other alkali metal hydroxides could be used, such as for instance KOH, lithium hydroxide, rubidium hydroxide or cesium hydroxide.

It is important that the pH be controlled to within the limits indicated previously, in both processes. In the second process, difficulties could be encountered in the preparation of the iron mud because of overheating during dissolution of the soluble ferrous compound in the concentrated caustic; therefore, care should be taken to prevent such overheating from occurring by controlling the rate of addition of the soluble ferrous compound, and/or by providing means to remove heat efficiently from the system.

EXAMPLE 1 (First Method)

(a) 800 ml of an aqueous solution containing 725 gpl $NaClO_3$, 52 gpl NaCl, 1.2 gpl $Na_2Cr_2O_7 . 2H_2O$ was prepared.

(b) This solution was heated to 50° C. The pH of the solution was adjusted to 8 with 50% NaOH. 10 ml. of 150 gpl $NaHS . XH_2O$ were added and stirred. After waiting 10 minutes, the pH had gone up to 11.5.

(c) Then 20.4 ml. of 150 gpl $FeSO_4 . 7H_2O$ were added. The solution was stirred vigorously, and the pH was monitored. The pH decreased to 4.5.

(d) The solution was then checked for Cr content and NaHS content, and the following was found:
Cr content — 0 ppm
NaHS content — 300 ppm (e) After waiting one-half hour, the pH had gone down to 2. No acid was added and the temperature was maintained at 50°–55° C during this one-half hour.

(f) The NaHS content of the solution was checked and a value of 0 ppm was found.

(g) The pH was raised to 7.5 and we checked for Cr and NaHS content, and the following was found:
Cr content — 0 ppm
NaHS content — 0 ppm

EXAMPLE 2 (First Method)

(a) 800 ml of an aqueous solution containing 725 gpl $NaClO_3$, 52 gpl NaCl, 1.2 gpl $Na_2Cr_2O_7 . 2H_2O$ was prepared.

(b) The solution was heated to 50° C. The pH was adjusted to 8 with a 50% NaOH solution. 10 ml. of 150 gpl $NaHS . XH_2O$ were added and stirred. After 10 minutes, the pH rose to 11.5.

(c) Then 20.4 ml of 150 gpl $FeSO_4 . 7H_2O$ were added. The solution was stirred vigorously, and the pH was monitored. It was noted that the pH dropped to 5.

(d) The solution was then checked for Cr content and NaHS content, and the following was found:
Cr content — 0 ppm
NaHS content — 300 ppm (e) After waiting one-half hour, the pH went down to 4.5. After waiting a further 15 minutes, the pH remained at 4.5. The NaHS content was then checked, and a value of 300 ppm was found.

(f) 0.4 ml of 1:5 HCl was then added, and the pH dropped below 4 and within 5 minutes was down to 2.

(g) The Cr and NaHS content were then checked, and the following was found:
Cr content — 0 ppm
NaHS content — 0 ppm

EXAMPLE 3 (First Method)

(a) An 800 ml aqueous solution with the same concentrations as in Example 1 and 2 above was prepared.

(b) The solution was heated to 50° C. The pH was adjusted to 8 with 50% NaOH solution. 10 ml of 150 gpl $NaHS . XH_2O$ were added and stirred. After waiting 10 minutes, the pH of the solution went up to 11.5.

(c) Then 20.4 ml of 150 gpl $FeSO_4 . 7H_2O$ were added, and the solution was stirred vigorously. The pH dropped to 5.

(d) Then the solution was analyzed for Cr content and NaHS content. The following results were obtained:
Cr content — 0 ppm
NaHS content — 300 ppm (e) After waiting one-half hour, the pH of the solution went down to 4.5. After waiting a further 15 minutes, the pH remained at 4.5. The solution was analyzed for NaHS content, and it was found that the NaHS content was 300 ppm.

(f) Then 0.4 ml 1:5 HCl were added, and the pH dropped to 3.8. Within 5 minutes, the pH had dropped to 2. The NaHS content was still 300 ppm.

(g) The Cr content and NaHS content of the solution were then checked. The following values were found:
Cr content — 0 ppm
NaHS content — 0 ppm (h) The pH of the solution was raised to 12, and the Cr content and NaHS content were again measured. The following values were found:
Cr content — 0 ppm
NaHS content — 0 ppm

EXAMPLE 4 (Second Method)

(a) A 12 liter solution containing 725 gpl NaClO3, 52 gpl NaCl, 1.2 gpl $Na_2Cr_2O_7 . 2H_2O$ was prepared. This solution was heated to 50° C. Its pH was 5.5, and analysis for NaClO revealed 0.0 gpl NaClO.

(b) The pH was raised to 11 by addition of a 50% NaOH solution (24 g NaOH dissolved in 24 g $H_2O$, 31.5 ml).

(c) Fe mud was prepared by weighing 322.4 g $FeSO_4 . 7H_2O$ and mixing it by stirring with 77.3 g NaOH dissolved in 77.3 g $H_2O$ (101 ml NaOH 50%). The mud is stable in air for 1 day at least, but for a thin surface layer oxidized to brown ferric salt. The consistency of the mud is quite high and it hardly flows. It could be diluted, e.g., 20% if needed for feeding purposes. This is four times the stoichiometric amount.

(d) The Fe mud was added slowly to the solution is about 5 minutes with a strong simultaneous agitation. The hot solution is transferred into a suitable container, which may be, for example, a 25 liter carboy with the top cut off, for precipitation under proper stirring. The suspension is checked for absence of Cr after addition of 75 ml of the Fe mud, and again after addition of 90 ml and 101 ml of the mud. Addition is stopped as soon as no Cr is observed by filtering a 10 ml aliquot with colourless filtrate.

(e) During the whole precipitation, the pH has remained constant at about 11.

The two methods of the present invention have two important advantages for pollution abatement. Firstly, chromates are eliminated from the system, and secondly, emission of hydrogen sulphide through the stacks is avoided. The second-mentioned method, involving the use of "Fe mud," does not require the use of any sulphide, and does not give rise to any gaseous pollutants.

We claim:

1. A method of removing chromate from aqueous alkali metal chlorate solutions which comprises:
adding to a chromate-containing aqueous solution of an alkali metal chlorate, at a temperature of about 40° to about 60° C, a water-soluble sulfide in an amount ranging from about 70 to about 200% of the stoichiometric value required to react with said chromate, said aqueous solution having an initial pH in the range of 7–8;

then adding to said solution a water-soluble ferrous salt in an amount ranging from about 30 to about 100% of the stoichiometric value required to react with said chromate, and adjusting the pH of the solution such that the final pH is in the range of about 1.8 to about 3.0, whereby said chromate is converted to an insoluble trivalent chromium-containing material and the sulfide is completely converted to elemental sulfur; and separating said insoluble trivalent chromium-containing material from said solution.

2. A method according to claim 1 wherein the aqueous alkali metal chlorate solution is an electrolytic cell liquor having a concentration of sodium chlorate ranging from about 600 gpl to about 750 gpl.

3. A method as defined in claim 2 wherein the electrolytic cell liquor has a concentration of $NaClO_3$ of about 725 gpl.

4. The method of claim 1 wherein the water-soluble sulfide is sodium hydrosulfide.

5. The method of claim 1 wherein the water-soluble ferrous salt is ferrous sulfate.

6. The method of claim 1 wherein the water-soluble sulfide is sodium hydrosulfide and the ferrous salt is ferrous sulfate.

7. A method according to claim 1 wherein the stoichiometric amount of said soluble sulfide required to react with said chromate is added to the solution.

8. The method of claim 1 wherein the amount of said ferrous salt which is used is about 57% of the stoichiometric amount required to react with said chromate.

9. A method according to claim 1 wherein the initial pH of the solution is about 8 and the final pH is about 2.

10. A method of removing chromate from aqueous alkali metal chlorate solutions which comprises:

adjusting the pH of a chromate-containing aqueous solution of an alkali metal chlorate to a value within the range of from about 7 to about 11, said solution having a temperature of about 40° to about 60° C;

adding to said solution the product obtained by reacting a ferrous salt with an alkali metal hydroxide in relative proportions of 1 part ferrous salt to 1.5–1.8 parts of said alkali metal hydroxide, the amount of said ferrous salt employed being from about 3 to about 5 times the stoichiometric amount required to reduce the chromate present in the solution, said addition being effected slowly, and simultaneously with strong agitation, and said pH being controlled to a value within the range of 10–12, whereby said chromate is converted to an insoluble trivalent chromium-containing material; and separating said insoluble trivalent chromium-containing material from said solution.

11. A method according to claim 10 wherein the ferrous salt is ferrous sulfate.

12. A method according to claim 11 wherein the alkali metal hydroxide is sodium hydroxide.

13. A method according to claim 12 wherein there is added to the solution an Fe mud obtained by reacting $FeSO_4 \cdot 7H_2O$ with NaOH in a molar proportion of 1.7 moles NaOH per 1 mole $FeSO_4$.

14. A method according to claim 10 wherein the aqueous alkali metal chlorate solution is an electrolytic cell liquor having a concentration of sodium chlorate ranging from about 600 gpl to about 750 gpl.

15. A method according to claim 14 wherein the electrolytic cell liquor has a sodium chlorate concentration of about 725 gpl.

16. A method according to claim 10 wherein the pH of the solution is maintained at a value of about 11.

* * * * *